US012473747B2

(12) United States Patent
Baumann et al.

(10) Patent No.: US 12,473,747 B2
(45) Date of Patent: Nov. 18, 2025

(54) LOCK BODY, PIN LOCK AND COMMAND DEVICE

(71) Applicant: Siemens Aktiengesellschaft, Munich (DE)

(72) Inventors: Christian Baumann, Fensterbach (DE); Jean Jacques Faurie, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 101 days.

(21) Appl. No.: 18/549,746

(22) PCT Filed: Mar. 3, 2022

(86) PCT No.: PCT/EP2022/055429
§ 371 (c)(1),
(2) Date: Sep. 8, 2023

(87) PCT Pub. No.: WO2022/189259
PCT Pub. Date: Sep. 15, 2022

(65) Prior Publication Data

US 2024/0167296 A1 May 23, 2024

(30) Foreign Application Priority Data

Mar. 8, 2021 (DE) ..................... 10 2021 202 192.1

(51) Int. Cl.
*E05B 27/00* (2006.01)

(52) U.S. Cl.
CPC ...... *E05B 27/0014* (2013.01); *E05B 27/0089* (2013.01)

(58) Field of Classification Search
CPC .......... E05B 9/045; E05B 9/084; E05B 9/086; E05B 27/00; E05B 27/0003; E05B 27/0085; E05B 27/0089
See application file for complete search history.

(56) References Cited

U.S. PATENT DOCUMENTS 396,628 A * 1/1889 Von Hoevenbergh ........................ E05B 27/0053 70/385
1,070,367 A * 8/1913 Voight ................ E05B 27/0053 70/340
1,487,307 A 3/1924 Best
1,561,771 A * 11/1925 Frank ...................... E05B 9/086 70/369
1,593,513 A 7/1926 Stone
2,122,478 A 7/1938 Liss
(Continued)

FOREIGN PATENT DOCUMENTS

CH 526709 A 8/1972
CN 106013979 A 10/2016
(Continued)

*Primary Examiner* — Christopher J Boswell
(74) *Attorney, Agent, or Firm* — Laurence A. Greenberg; Werner H. Stemer; Ralph E. Locher

(57) ABSTRACT

A lock body for a pin lock is of multipart construction and has a main body and a divider, mounted on the main body, with a plurality of bores for receiving springs and locking pins. The mechanical division of the lock body into the main body and the divider allows simpler and more cost-effective production since the lock body no longer needs to be complicatedly machined out of a solid material, for example brass, but rather more cost-effective production methods can be used.

15 Claims, 4 Drawing Sheets

(56) References Cited

U.S. PATENT DOCUMENTS

| | | | | | |
|---|---|---|---|---|---|
| 4,391,112 | A * | 7/1983 | Neyret | E05B 27/00 | 70/373 |
| 4,631,941 | A * | 12/1986 | Sjunnesson | E05B 27/0053 | 70/389 |
| 4,732,023 | A * | 3/1988 | Shen | E05B 27/005 | 70/378 |
| 5,079,936 | A * | 1/1992 | Stefanek | E05B 27/0057 | 70/358 |
| 5,507,163 | A * | 4/1996 | Juang | E05B 9/086 | 70/369 |
| 6,079,240 | A * | 6/2000 | Shvarts | E05B 27/0082 | 70/423 |
| 6,708,539 | B1 * | 3/2004 | Widen | E05B 9/04 | 70/369 |
| 6,748,777 | B1 * | 6/2004 | Livingston | E05B 9/086 | 70/369 |
| 6,981,396 | B1 * | 1/2006 | Kim | E05B 27/0082 | 70/369 |
| 7,958,759 | B2 * | 6/2011 | Herdman | E05B 9/086 | 70/338 |
| 8,794,042 | B2 * | 8/2014 | Herdman | E05B 27/0007 | 70/343 |
| 8,950,226 | B2 * | 2/2015 | Dolev | E05B 35/003 | 70/395 |
| 10,337,210 | B2 * | 7/2019 | Widén | E05B 27/0039 | |
| 2012/0240645 | A1 | 9/2012 | Mathachan | | |

FOREIGN PATENT DOCUMENTS

| | | | |
|---|---|---|---|
| CN | 210714166 | U | 6/2020 |
| DE | 1939952 | A1 | 2/1970 |
| DE | 2613605 | A1 | 11/1976 |
| DE | 3134471 | A1 | 3/1983 |
| GB | 1545294 | A | 5/1979 |
| GB | 2055949 | A | 3/1981 |
| JP | 2007303192 | A | 11/2007 |
| TW | 443383 | U | 6/2001 |

* cited by examiner

LOCK BODY, PIN LOCK AND COMMAND DEVICE

FIELD AND BACKGROUND OF THE INVENTION

The invention relates to a lock body for a pin lock, for example a cylinder lock or a dimple lock. Furthermore, the invention relates to a pin lock having such a lock body and to a command device, for example a pushbutton or selector switch, for a machine or electrical system, having such a pin lock.

A pin lock consists substantially of a lock body and of a cylinder which can be rotated in a bore of the lock body. The cylinder has a number of radial bores which are situated in a radial plane of the cylinder, end at the circumference of the cylinder and open into a keyway. A number of bores arranged to correspond to the radial bores are formed in the lock body of the pin lock, these bores each forming an extension of the radial bores in the cylinder in a predefined angular position of the cylinder. Locking pins—lock body pins and cylinder pins—are received in these bores of the lock body and of the cylinder and are pressed in the direction of the cylinder by means of springs. The length of the individual pins is dimensioned in such a way that, when inserting a coded key into the keyway in the predefined angular position, the contact surfaces of the cylinder pins and of the corresponding lock body pins are situated in the lateral surface of the cylinder. The basic design of such a pin lock is known, for example, from U.S. Pat. No. 1,593,513.

Such pin locks can be used for different applications. Some applications use pin locks in order to secure different positions, for example of a mechanism or a switch, against an intended or unintended adjustment of the relevant position as a result of withdrawing the key. For these applications, it is therefore required that the key can be withdrawn at different, predefined angular positions. In order to realize a plurality of such key withdrawal positions, that is to say a plurality of predefined angular positions of the cylinder, at which the key can be withdrawn, a plurality of rows of radial bores are correspondingly required in the lock body or in the cylinder to receive pins and springs. The production of such a lock body, which is generally produced as a turned or drilled part, preferably from brass, is comparatively complicated, in particular for applications having a plurality of key withdrawal positions.

SUMMARY OF THE INVENTION

It is therefore the object of the present invention to provide an alternative lock body, a corresponding pin lock and a corresponding command device which are distinguished by simplified—and thus more cost-effective—production.

This object is achieved according to the invention by the lock body, the pin lock and the command device as claimed in the independent claims. Advantageous embodiments of the lock body, of the pin lock and of the command device according to the invention form the subject matter of the dependent claims.

The lock body according to the invention for a pin lock is of multipart design and has a main body and a divider, mounted on the main body, with a plurality of bores for receiving springs and locking pins.

The mechanical division of the lock body into the main body and the divider allows simpler and more cost-effective production, since the lock body no longer has to be complicatedly machined out of a solid material, for example brass, but instead more cost-effective production methods can be used.

In an advantageous development of the lock body, the divider can be connected to the main body by being displaced in a longitudinal direction.

For mounting on the main body, the divider is pushed onto the main body in the longitudinal direction, which corresponds to the key withdrawal direction of the pin lock, for example by means of a dovetail guide or the like. The final position of the divider on the main body can be defined by a latching connection.

In a further advantageous development of the lock body, the divider has at least two rows of bores.

The bores of a bore row are arranged behind one another in the longitudinal direction; the individual bore rows are arranged so as to be offset from one another in predefined angular positions in the circumferential direction. Each of the at least two bore rows serves to realize a dedicated key withdrawal position.

In a further advantageous development of the lock body, the main body and the divider are formed from different materials.

This results in the advantage that the materials used for the individual components can be adapted to the mechanical requirements of the respective component—for example hardness, toughness, abrasion resistance, etc. Suitable materials for the lock body and the divider are not only metals and metal alloys but also plastics.

In a further advantageous development of the lock body, the main body and/or the divider can be produced by means of an injection molding method or an additive manufacturing method.

By comparison with the conventional production method in which the lock body is machined out of a solid material blank by means of material-removal methods, for example drilling, milling, etc., the production of the lock body by a metal or plastic injection molding method or by means of an additive manufacturing method represents a considerable cost advantage in particular in the case of relatively high quantities. The two method types—both injection molding methods and additive manufacturing methods—can be used both for metallic and nonmetallic materials, for example plastics or synthetic resins.

In a further advantageous development, the lock body is configured to be tubular, wherein the divider is configured as a ring sector of the tubular lock body.

The expression "ring sector" is to be understood as meaning a circumferential portion of the tubular lock body. Both the divider and the main body can be formed as a ring sector.

In a further advantageous development of the lock body, the main body is also configured as a ring sector.

In a further advantageous development, the lock body has a sleeve which at least partially encloses the main body and the divider.

Since the sleeve outwardly encloses the divider on the outer side, the bores arranged in the divider and intended to receive the springs and locking pins can be formed as through-bores. The blind hole bores to be configured from the inner side can thus be replaced by through-bores to be configured from the outer side. By changing the machining side (from the inner side to the outer side), bores of a plurality of bore rows can also be configured in parallel, which was not possible previously owing to collision of the tools. As a result, the production costs can be further reduced.

In a further advantageous development of the lock body, the sleeve is connected in one piece to the main body.

Particularly when using an additive manufacturing method, the one-piece configuration of the main body and sleeve makes it possible for the assembly effort—and hence the production costs—to be further reduced.

The pin lock according to the invention has a multipart lock body of the above-described type and a lock core (4) which is received in and mechanically coupled to the lock body.

With regard to the advantages of the pin lock according to the invention, reference is made to the above statements relating to the advantages of the lock body according to the invention.

The command device according to the invention—for example a pushbutton, key switch or selector switch—for a machine or electrical system has a pin lock with a multipart lock body of the above-described type and at least one contact element which can be contacted in a predefined angular position of the lock core (4).

Command devices are used in machines or electrical systems and serve as operator-control devices—for example as pushbuttons or selector switches—in order to act on the control of the machine or electrical system. For this purpose, the command device has one or more contact or switching elements which are electrically conductively connected to the control of the machine or electrical system. Such command devices are mounted in control panels, operator panels, switchgear cabinet doors or housing covers of the machine or electrical system. The command device can take the form of a key switch, that is to say that the command device has a mechanical lock, for example a pin lock, in order to arrest the switch position of the command device by withdrawing the key in order to avoid operating errors—for example in the context of maintenance or repair work—or to prevent unauthorized actuation of the command device which would lead, for example, to unauthorized switching off of the machine or electrical system. With regard to the further advantages of the command device according to the invention, reference is made to the above statements relating to the advantages of the pin lock according to the invention or of the lock body according to the invention.

An exemplary embodiment of the lock body according to the invention for a pin lock will be explained in more detail below with reference to the appended figures, in which:

DETAILED DESCRIPTION OF THE INVENTION

Figure 1:
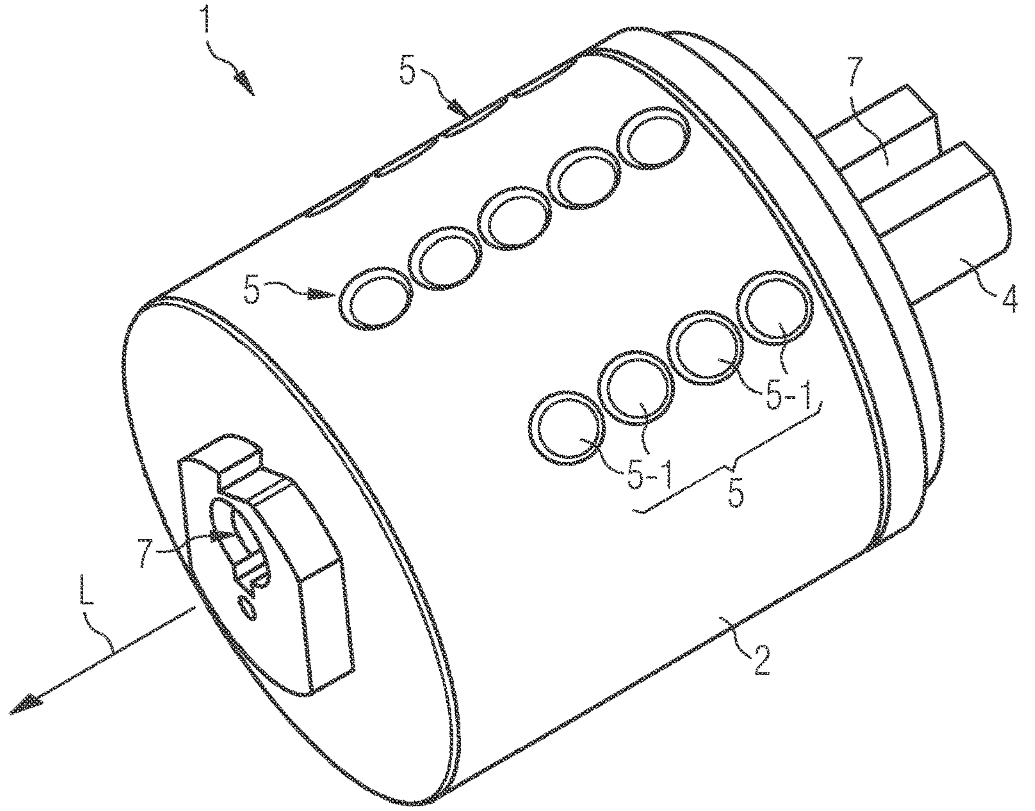
FIGS. 1 and 2 show schematic illustrations of the basic design of a pin lock.

In the various figures of the drawing, identical parts are always provided with the same reference signs. The description applies to all drawing figures in which the corresponding part can likewise be seen.

Figure 2:
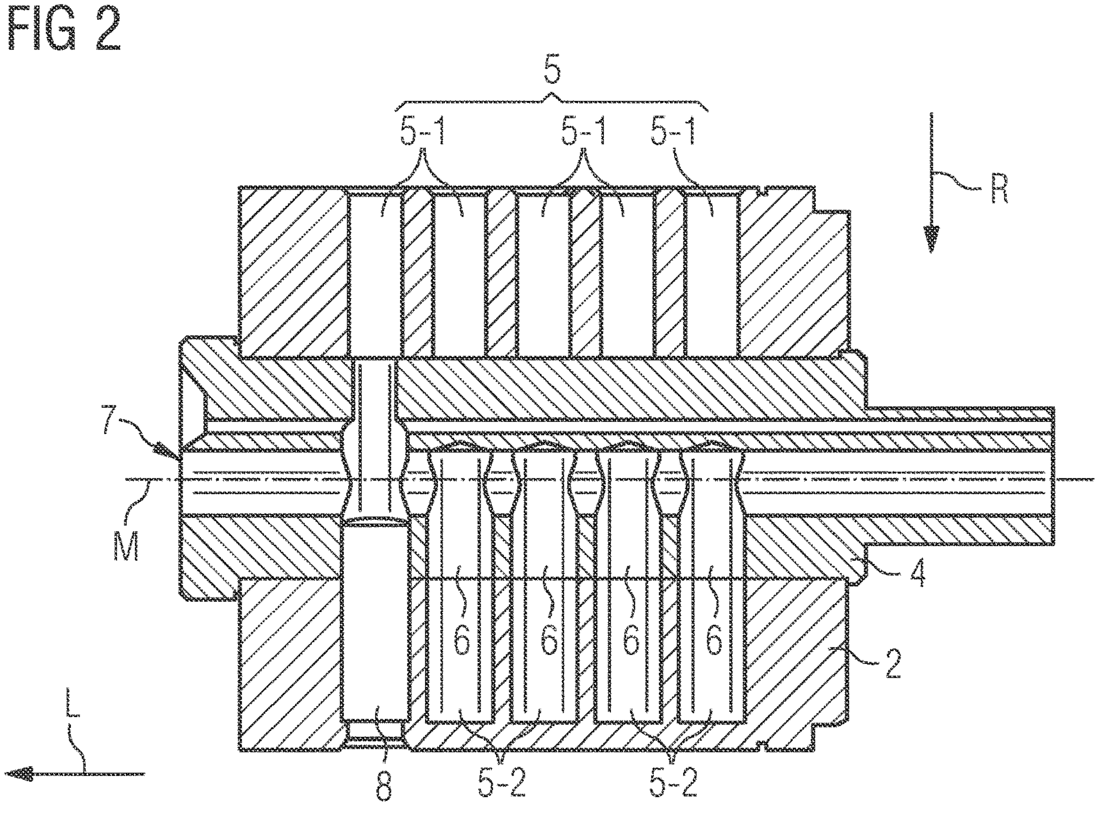

FIGS. 1 and 2 schematically illustrate the basic design of a pin lock 1 in various views. FIG. 1 shows a perspective illustration of such a pin lock 1, and FIG. 2 shows an associated perspective sectional illustration. The pin lock 1 has a substantially cylindrical lock body 2 and a cylindrical lock core 4 which is plugged and rotatably mounted in an axial central bore 3 (see FIG. 3), configured in a longitudinal direction L, of the lock body 2. The lock core 4 has a keyway 8 which runs in the longitudinal direction L and serves for inserting a key (not shown).

Furthermore, the lock body 2 has a plurality of radial bores 5 which run in a radial direction R and are arranged in rows.

A plurality of these radial bores 5, which are arranged next to one another and spaced apart from one another in the longitudinal direction L, are combined to form a bore row 6. A plurality of bore rows 6 are arranged next to one another in a circumferential direction of the lock body 2 and spaced apart from one another at a predefined distance. A key withdrawal position of the pin lock 1 is defined by each of the bore rows 6.

The radial bores 5 are configured to run exactly radially with respect to a center axis M of the lock body 2, which is also the center axis M of the lock core 4. The individual radial bores 5 extend beyond the center axis M, pass through the central bore 3 and each end as an assigned blind hole bore 5-2 in the opposite cylinder wall of the lock body 2. Each of the radial bores 5 thus consists of a through-bore 5-1, which extends from an outer side of the lock body 4 to the central bore 3, and of the associated blind hole bore 5-2. These blind hole bores 5-2 serve to receive springs and locking pins (not shown) of the pin lock 1.

In the exemplary embodiment illustrated, the lock body 2 has three bore rows 6, wherein the central bore row consists of five radial bores 5, whereas the two outer bore rows 6 only consist of four radial bores 5. In each case four of the blind hole bores 5-2 of a bore row 6 serve to receive the springs and locking pins of the pin lock 1, whereas the fifth blind hole bore 5-2 of the central bore row serves to receive an arresting element, which takes the form of a securing pin 9 in the present exemplary embodiment. The lock core 4 in the lock body 2 is secured against demounting by means of the securing pin 9. However, the configuration of the arresting element as a securing pin 9 is to be understood to be only by way of example and is not essential to the invention.

The lock core 4 also has a bore row with four core bores 7, which also run radially with respect to the center axis M and open into the keyway 8. If the lock core 4 is plugged into the lock body 2, it is thus the case that, in a predefined angular position of the lock core 4, the core bores 7 formed therein are aligned with the blind hole bores 5-2 formed in the lock body 2. During mounting, first of all the springs and then the locking pins—lock body pins and cylinder pins—are plugged into the blind hole bores 5-2, wherein the 6 locking pins are pressed by the springs in the direction of the lock core 4. If the lock core 4 is brought into one of the predefined angular positions, the locking pins are pressed into the core bores 7 assigned thereto that are formed in the lock core 4. The length of the individual locking pins is dimensioned such that, when inserting a coded key into the keyway 8 in the predefined angular positions, the contact surfaces of the cylinder pins and of the corresponding lock body pins are situated in the cylinder lateral surface of the lock core 4, with the result that the lock core 4 can be rotated with respect to the lock body 2.

Figure 3:
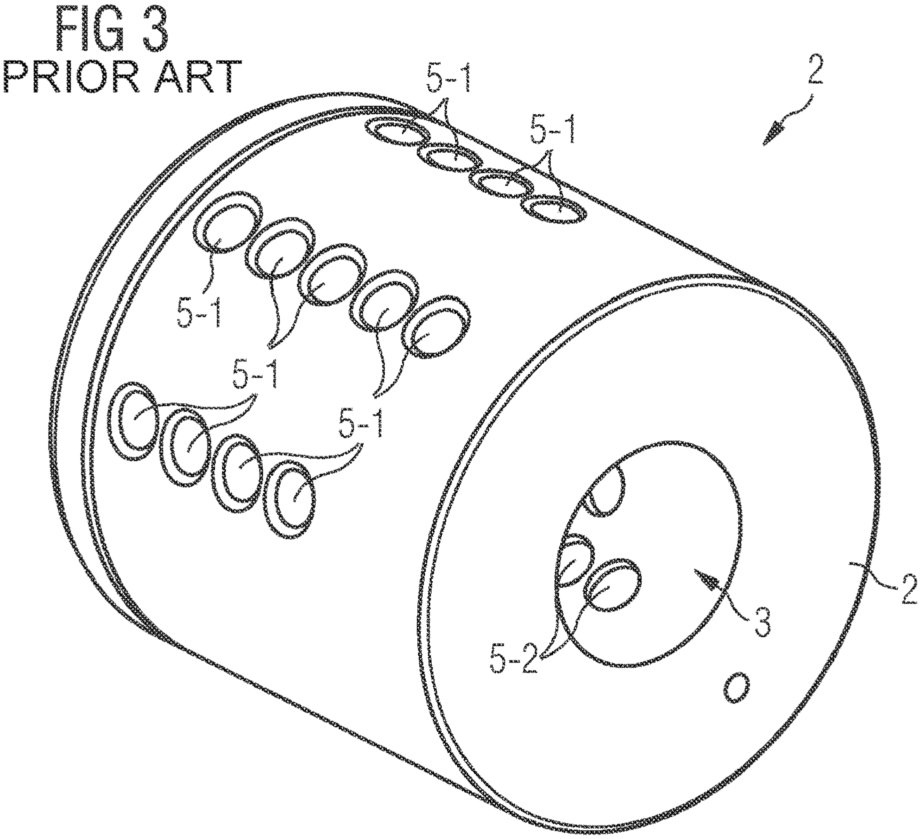
FIG 3 PRIOR ART
FIGS. 3 and 4 show schematic illustrations of a lock body known from the prior art.
Figure 4:
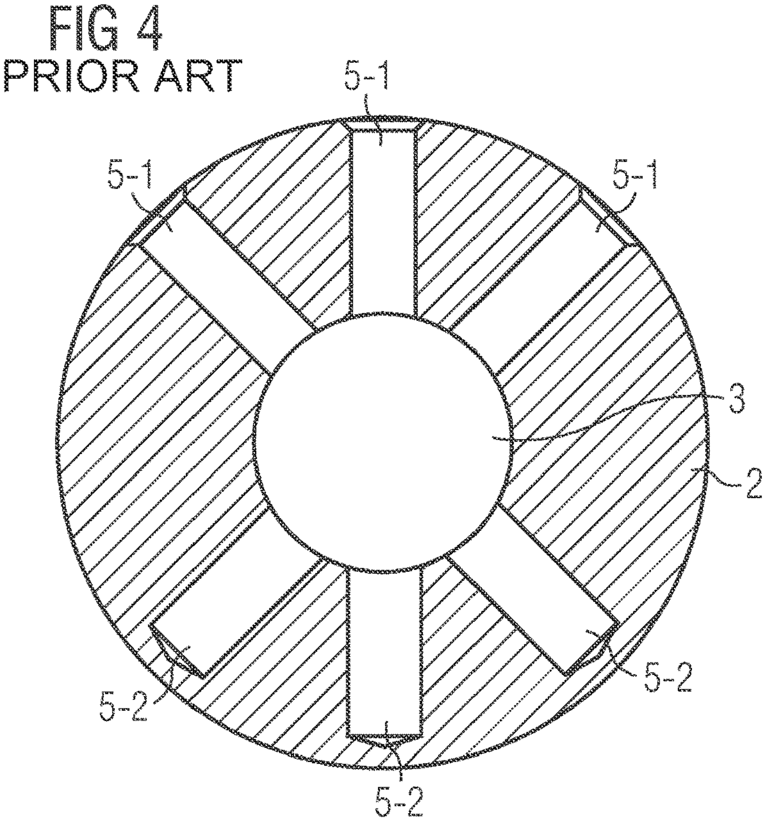
FIG 4 PRIOR ART

FIGS. 3 and 4 show further schematic illustrations of the lock body 2 known from the prior art. In FIG. 3, the lock body 2 is illustrated in perspective, and FIG. 4 shows an associated further section through the lock body 2, wherein the section plane is oriented orthogonally to the longitudinal direction L. The production process for this lock body 2 with one or more key withdrawal positions is represented below on the basis of these illustrations.

The blank used for the lock body 2 is generally a solid bar material, for example a copper alloy such as brass or an iron alloy, which is first of all cut to the required length. The blank is then turned to the predetermined outside diameter and the central bore 3 running in the longitudinal direction L is produced. Subsequently, the radial bores 5 are produced to correspond to the number of withdrawal positions. Each of the radial bores 5 consists of the through-bore 5-1 and of the assigned blind hole bore 5-2 arranged in the opposite cylinder wall of the lock body 2.

The radial bores 5 of a bore row 6 need not necessarily be produced after one another, that is to say in a chronologically successive manner. When using a suitable drilling tool, it is also possible to create a plurality of or all radial bores 5 of a bore row 6 chronologically in parallel, that is to say simultaneously. However, radial bores 5 of a plurality of bore rows 6 cannot be produced simultaneously since the drilling tools would collide with one another in the region of the central bore 3, more precisely in the region of the center axis M. This is also clear from the sectional illustration according to FIG. 4, 11 wherein the section is chosen such that the section plane passes through the drilling channels, which run in the radial direction R, of the individual radial bores 5 of the three bore rows 6.

Figure 5:
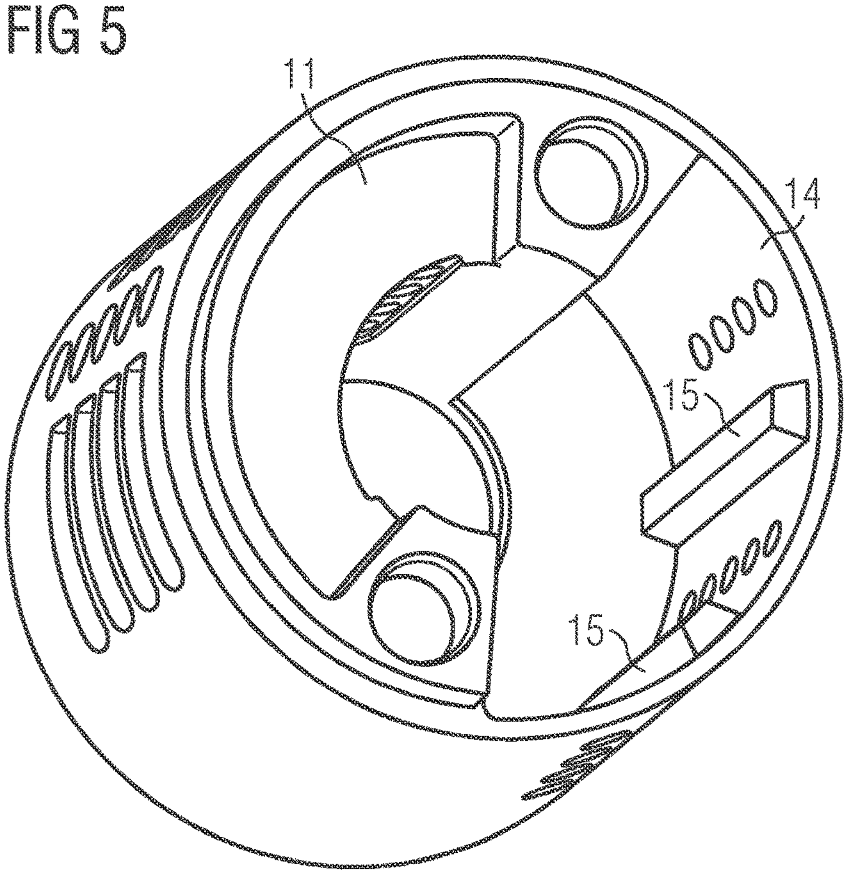
FIGS. 5 to 7 show schematic illustrations of the lock body according to the invention.
Figure 6:
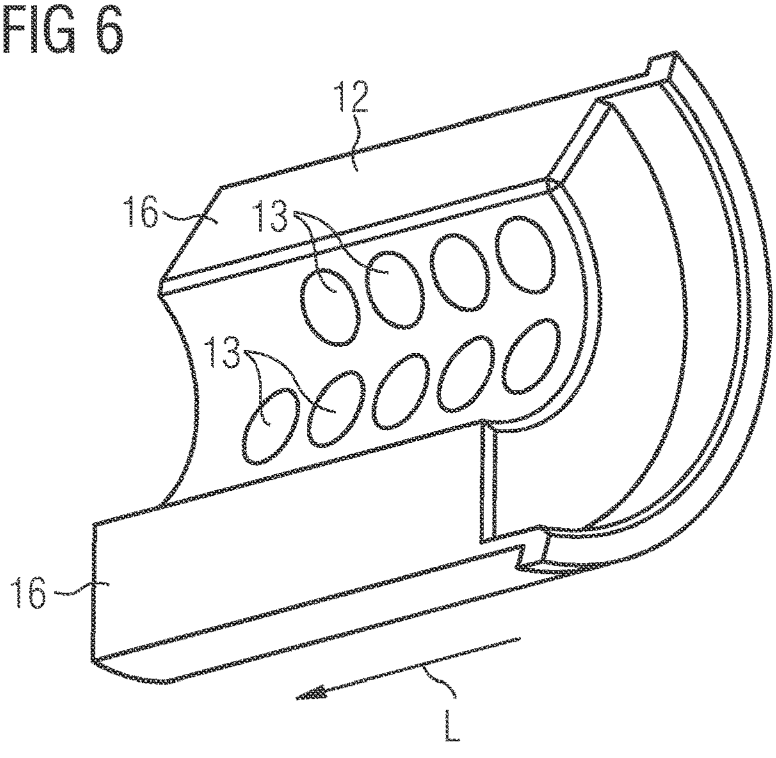
Figure 7:
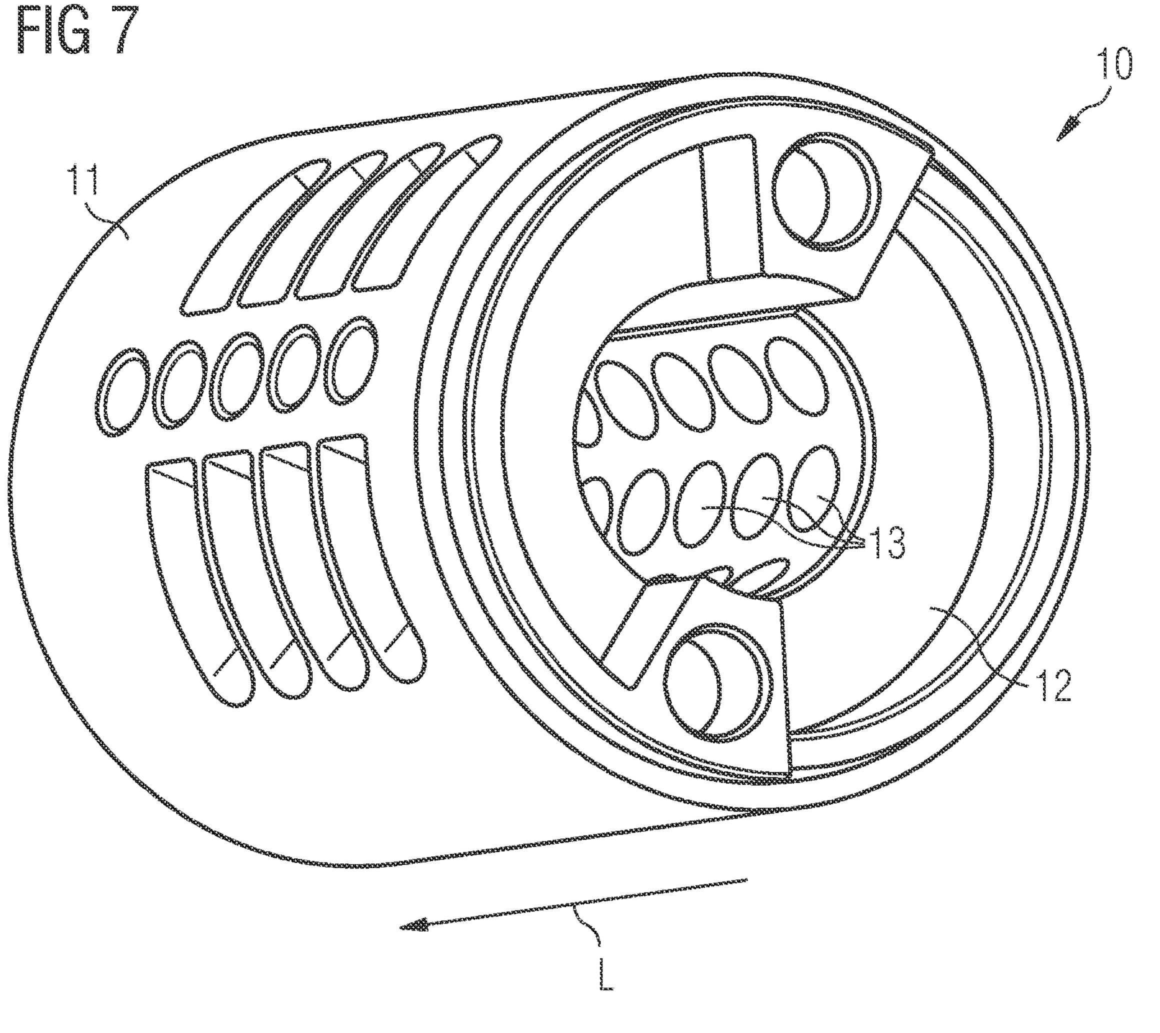

In FIGS. 5 to 7, the lock body 10 according to the invention is schematically illustrated in various views. FIGS. 5 and 6 illustrate essential individual parts of the lock body 10 in a perspective view. FIG. 7 shows—also in a perspective view—the lock body 10 mounted from the individual parts.

The lock body 10 according to the invention is thus of multipart design and has a main body 11 and a divider 12 which can be mounted on the main body 11. The lock body 10 is tubular or hollow cylindrical in form, wherein the divider is configured as a ring sector of the tubular or hollow cylindrical lock body 10 and is supplemented with the main body 11, likewise configured as a ring sector, to form the tubular or hollow cylindrical lock body 10.

A plurality of bores 13 are formed in the divider 12 and serve to receive springs and locking pins of a pin lock. In the example illustrated in FIGS. 5 to 7, the bores 13 are grouped into three bore rows, wherein a key withdrawal position of the pin lock 1 is defined by each of the bore rows. The multipart configuration of the lock body 10 makes it possible to avoid a collision of the drilling tools, as would occur when producing the radial bores 5. A through-bore in the main body 11 is also not required to produce the bores 13 for receiving the springs and locking pins.

In the exemplary embodiment illustrated, the lock body 10 has a sleeve 14 which can be integrally formed on the main body 11, but does not necessarily have to be integrally formed thereon. It is also possible to provide the sleeve 14 as an independent component which can be mechanically or chemically connected to the main body 11. For connection to the main body 11, the divider 12 has on its outer side two grooves (not shown) which, in terms of their geometry and spatial positions, correspond to two webs 15 arranged on an inner side of the sleeve 14, with the result that the divider 12 can be mechanically connected to the main body 11 by being pushed on in the longitudinal direction L.

For the case that the lock body 10 does not have a sleeve 14, the grooves and webs would have to be provided on contact surfaces 16 of the main body 11 and of the divider 12. The use of a sleeve 14 also has the advantage that the bores 13 no longer have to be configured as blind holes, but can also be configured as through-bores, since the springs to be received in the bores can be supported on the inner side of the sleeve 14.

The expression "bore 13" used in conjunction with the description of the lock body 10 according to the invention does not necessarily imply that this bore also has to be produced by drilling. Specifically, owing to the multipart design of the lock body 10, it is possible to use other, more efficient production methods than drilling and turning—for example metal or plastic injection molding methods, but also additive manufacturing methods—for producing the main body 11 and the divider 12, including the bores 13 formed therein. Furthermore, different, functionally specific materials can be used for the main body 11 and the divider 12, which materials optimally meet the requirements placed on the respective component—for example in terms of stability or wear resistance.

LIST OF REFERENCE SIGNS

- 1 Pin lock
- 2 Lock body
- 3 Central bore
- 4 Lock core
- 5 Radial bore
  - 5-1 Through-bore
  - 5-2 Blind hole bore
- 6 Bore row
- 7 Core bore
- 8 Keyway
- 9 Arresting element/securing pin
- 10 Lock body
- 11 Main body
- 12 Divider
- 13 Bore
- 14 Sleeve
- 15 Web
- 16 Contact surface
- L Longitudinal direction
- M Center axis
- R Radial direction

The invention claimed is:

1. A lock body of a multipart configuration for a pin lock, the lock body comprising:

a main body; and a divider mounted on said main body, said divider having a plurality of bores formed therein for receiving springs and locking pins, wherein said divider has at least two rows of said bores, a key withdrawal position of the pin lock being defined by each of said at least two rows of said bores.

2. The lock body according to in claim 1, wherein said divider is connected to said main body by being displaced in a longitudinal direction.

3. The lock body according to claim 1, wherein said main body and said divider are formed from different materials.

4. The lock body according to claim 1, wherein said main body and/or said divider is produced by means of an injection molding method or an additive manufacturing method.

5. The lock body according to claim 1, wherein:

said lock body is a tubular lock body; and said divider is configured as a ring sector of the tubular lock body.

6. The lock body according to claim 5, wherein said main body is configured as a ring sector.

7. The lock body according to claim 1, further comprising a sleeve which at least partially encloses said main body and said divider.

8. The lock body according to claim 7, wherein said sleeve is connected in one piece to said main body.

9. The lock body according to in claim 7, wherein said divider is two parts constructed as a ring sector of the of said lock body.

10. The lock body according to in claim 9, wherein said bores are through-bores.

11. The lock body according to in claim 7, wherein said sleeve has webs and said divider has grooves corresponding to said webs to connect said sleeve to said divider.

12. A pin lock, comprising:

the lock body according to claim 1; and a lock core received in and mechanically coupled to said lock body.

13. A command device for a machine or electrical system, the command device comprising:

the pin lock formed according to claim 12; and at least one contact element which is contacted in a predefined angular position of said lock core.

14. The command device according to claim 13, wherein the command device is selected from the group consisting of a key switch, a pushbutton switch and a selector switch for the machine or the electrical system.

15. The lock body according to in claim 1, wherein said lock body and said main body are concentric.

* * * * *